(12) United States Patent
Kulkarni

(10) Patent No.: US 9,137,727 B2
(45) Date of Patent: Sep. 15, 2015

(54) CONTROLLED CLIENT ROAMING

(75) Inventor: Sudarshan Kulkarni, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 13/435,715

(22) Filed: Mar. 30, 2012

(65) Prior Publication Data

US 2013/0259005 A1  Oct. 3, 2013

(51) Int. Cl.
*H04W 36/30* (2009.01)
*H04W 36/00* (2009.01)
*H04W 36/08* (2009.01)
*H04W 84/12* (2009.01)

(52) U.S. Cl.
CPC ............. *H04W 36/30* (2013.01); *H04W 36/08* (2013.01); *H04W 84/12* (2013.01)

(58) Field of Classification Search
CPC ...... H04W 36/08; H04W 36/30; H04W 84/12
USPC .................................................. 370/328–333
See application file for complete search history.

(56) References Cited

U.S. PATENT DOCUMENTS

| | | | | |
|---|---|---|---|---|
| 7,512,096 B2 * | 3/2009 | Kuzminskiy et al. | ......... | 370/329 |
| 7,535,881 B2 * | 5/2009 | Maekawa et al. | ............. | 370/338 |
| 7,715,442 B2 * | 5/2010 | Trainin et al. | .................. | 370/503 |
| 2004/0136396 A1 * | 7/2004 | Yonge et al. | .................... | 370/445 |
| 2005/0083962 A1 * | 4/2005 | Khun-Jush et al. | ........... | 370/445 |
| 2005/0180357 A1 * | 8/2005 | Tao et al. | ....................... | 370/329 |
| 2006/0025127 A1 * | 2/2006 | Cromer et al. | ............. | 455/432.1 |
| 2006/0153151 A1 * | 7/2006 | Huang et al. | .................. | 370/338 |
| 2007/0156016 A1 * | 7/2007 | Betesh et al. | .................. | 600/102 |
| 2008/0075035 A1 * | 3/2008 | Eichenberger | ................ | 370/328 |
| 2008/0080470 A1 * | 4/2008 | Yano et al. | ..................... | 370/342 |
| 2008/0151849 A1 * | 6/2008 | Utsunomiya et al. | ......... | 370/338 |
| 2008/0161001 A1 * | 7/2008 | Holcman et al. | .............. | 455/436 |
| 2008/0192644 A1 * | 8/2008 | Utsunomiya et al. | ......... | 370/252 |
| 2009/0141696 A1 * | 6/2009 | Chou et al. | ..................... | 370/345 |
| 2009/0203377 A1 * | 8/2009 | Kawasaki | .................. | 455/435.1 |
| 2010/0002623 A1 * | 1/2010 | Bims | ............................. | 370/315 |
| 2011/0134855 A1 * | 6/2011 | Fujii et al. | ...................... | 370/329 |
| 2011/0222524 A1 * | 9/2011 | Thomson et al. | ............. | 370/339 |
| 2012/0040676 A1 * | 2/2012 | Jang et al. | ...................... | 455/436 |
| 2012/0082070 A1 * | 4/2012 | Hart et al. | ...................... | 370/280 |
| 2012/0314673 A1 * | 12/2012 | Noh et al. | ...................... | 370/329 |
| 2013/0021967 A1 * | 1/2013 | Hwang et al. | ................. | 370/328 |
| 2013/0215809 A1 * | 8/2013 | Chang et al. | .................. | 370/311 |

* cited by examiner

*Primary Examiner* — Andrew Lai
*Assistant Examiner* — M Mostazir Rahman (57) ABSTRACT

The present disclosure discloses a network device and method for controlled client roaming. The disclosed network device receives an update of a signal strength corresponding to a packet received from a client by a first access point in a network. The network device also tracks signal strengths corresponding to packets received from the client by a plurality of access points. Next, the network device determines whether a client is likely to have better connectivity with a second access point than the first access point among the plurality of access points based at least on the tracked signal strengths corresponding to packets received from the client by the first access point and the second access point. If so, the network device controls the client to connect with the second access point.

22 Claims, 8 Drawing Sheets

| CLIENT 400 | AP1 410 | AP2 420 | ... ... |
|---|---|---|---|
| Client 1 402 | $RSSI_{11}$ 492 | $RSSI_{21}$ 496 | ... ... |
| Client 2 405 | $RSSI_{12}$ 494 | $RSSI_{22}$ 498 | ... ... |
| ... ... | ... ... | ... ... | ... ... |

CONTROLLED CLIENT ROAMING

FIELD

The present disclosure relates to client roaming in a wireless network. In particular, the present disclosure relates to controlling a client's roaming decisions by a network device in the wireless network.

BACKGROUND

Wireless networks, such as networks operating under Institute of Electrical and Electronics Engineers (IEEE) 802.11 standards, are spreading in their popularity and availability. With such popularity, however, comes the problem of communication channel management. Specifically, since many clients on the same wireless communication channel may share and compete for channel access, network performance typically depends on the number of clients that share the wireless communication channel within a given radio frequency neighborhood. Thus, it is advantageous to distribute clients to span across different wireless communication channels in a given radio frequency neighborhood.

Roaming generally refers to passing a client from one access point (AP) to another access point in a wireless local area network (WLAN) while the client remains connected to the WLAN. Note that, in some specific scenarios, a client may be handed over from one AP in one network to another AP in a different network of a different type.

In previous solutions to client roaming in WLAN, the client's roaming decision usually is based on the client itself. According to one conventional scheme, a client selects one of multiple APs in the network to associate with based on signal strengths (for example, as identified by Received Signal Strength Indication, RSSI) of packets received from the APs. Specifically, the higher a RSSI is for a packet received from an AP, the more likely it is for the client to select the AP to associate with. Hence, network devices such as access points do not have any control over the client's roaming decisions in this process.

Moreover, when a client moves from one AP to another AP, it is possible for the client to reach a location point where the signal strengths associated with the packets received by the two APs are equal. Such condition can cause the client to toggle between the two APs. For example, at time $t_1$, the client may detect that the RSSI of a packet received from $AP_1$ to be slightly higher than the RSSI of another packet received from $AP_2$ in the same network. Thus, the client would associate with $AP_1$, at time $t_1$. Thereafter, at time $t_2$, the client may detect that the RSSI of a packet received from $AP_2$ to be slightly higher than the RSSI of another packet received from $AP_1$. Thus, the client would associate with $AP_2$ instead at time $t_2$. Shortly after the client switch to associate with $AP_2$, the client may soon detect that the RSSI of a packet received from $AP_1$ to be higher than the RSSI of another packet received from $AP_2$ again, and thus the client may associate back with $AP_1$ at time $t_3$.

According to an alternative implementation scheme, a client may have a predetermined high RSSI watermark and a predetermined low RSSI watermark. The client will decide to switch to associate with $AP_2$ from $AP_1$ if the RSSI of a packet received from $AP_2$ is higher than the high RSSI watermark, and if the RSSI of a packet received from $AP_1$ is lower than the low RSSI watermark. With the predetermined high and low watermarks, it is less likely for the toggling situation to rise. However, in certain scenarios, a toggling situation may still occur. For example, assuming that, at time $t_1$, the client is at a location where the signals from $AP_2$ are obstructed. Thus, the RSSI of a packet received from $AP_2$ may be just slightly above the predetermined low RSSI watermark, but lower than the predetermined high RSSI watermark. Also, the RSSI of a packet received from $AP_1$ is likely to be higher than the RSSI of the packet received from $AP_2$. Thus, the client will remain associated with $AP_1$ at the location at time $t_1$. Further assuming that, at time $t_2$, the client moves to a new location where signals from $AP_2$ are not obstructed. The new location at time $t_2$ is closer to $AP_2$ and farther to $AP_1$ than the original location at time $t_1$. Thus, the RSSI of the packet from $AP_2$ received at time $t_2$ is likely to be above the predetermined high RSSI watermark; and, the RSSI of the packet from $AP_1$ received at time $t_1$ is likely to drop below the predetermined low RSSI watermark. Thus, the client will likely to associate with AP2. If the client subsequently moves between the old location and the new location, a toggling situation will result.

The above described scenarios are more likely to happen with high mobility devices, such as handheld devices, Voice-over-WLAN clients, etc. Usually, the high and low RSSI watermarks are predetermined. They are neither configurable on a per-device basis nor dynamically configurable. Moreover, the mixture of devices makes it difficult to configure the high and low RSSI watermarks for each device in order to improve operations in complex network deployments and to facilitate a client's roaming decisions.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to client roaming management in a wireless network and, particularly, to controlled client roaming by network devices in wireless networks. Embodiments of the present disclosure provide a solution that both complies with requirements by wireless technology standards and improves roaming decisions. With the solution provided herein, a network device, such as an access point, receives an update of a signal strength corresponding to a packet received from a client by a first access point in a network. The network device also tracks signal strengths corresponding to packets received from the client by a plurality of access points in the network. Furthermore, the network device determines that the client is likely to have better connectivity with a second access point than the first access point among the plurality of access points based at least on the tracked signal strengths corresponding to packets received from the client by the first access point and the second access point. In addition, the network device controls the client to connect with the second access point.

In some embodiments, the network device signals a first access point to disallow the client to connect with the first access point; and, signals a second access point to respond to a connection request received from the client. For example, in some embodiments, the network device signals the first access point to ignore a probe request received from the client. In some embodiments, the network device signals the first access point to disassociate with the client which has been associated with the first access point. In other embodiments, the network device signals the first access point to de-authenticate the client which has been authenticated by the first access point.

In some embodiments, the network device retrieves a first predetermined threshold indicating a weak signal strength level for packets received from the client by the first access point. Furthermore, the network device can determine whether the signal strength corresponding to the packet received from the client by the first access point is weaker than the first predetermined threshold.

Particularly, in some embodiments, the network device retrieves a second predetermined threshold indicating a strong signal strength level for packets received by the client from the second access point. Furthermore, the network device can determine whether signal strength corresponding to the packet received from the client by the second access point is stronger than the second predetermined threshold.

In some embodiments, the network device determines whether a client is likely to have better connectivity with the second access point than a third access point among the plurality of access points based at least on the tracked signal strengths corresponding to packets received from the client by the second access point and the third access point. If so, the network device signals the third access point to disallow the client to connect with the third access point.

In some embodiments, the network device retrieves a third predetermined threshold indicating a strong signal strength level for packets received by the client from the third access point. Furthermore, the network device can determine whether the signal strength corresponding to the packet received from the client by the third access point is stronger than the third predetermined threshold.

Specifically, in some embodiments, the network device determines whether the signal strength corresponding to the packet received from the client by the second access point is stronger than the signal strength corresponding to the packet received from the client by the third access point in response to determining that the signal strength corresponding to the packet received from the client by the third access point is stronger than the third predetermined threshold.

In some embodiments, the network device also stores signal strengths corresponding to packets received from a plurality of clients by the plurality of access points, wherein the signal strengths are indexed by one or more of a client identifier and an access point identifier. Note that, the signal strength can be determined by one or more of wireless signal strength or radio frequency interference measurements, such as Received Signal Strength Indicator (RSSI), Signal Noise Ratio (SNR), Noise Figure (NF), Noise Factor (F), Excess Noise Ratio (ENR), etc. Moreover, the network device updates one or more previously stored signal strengths corresponding to the client and the first access point based on a received update.

Network Device Controlled Roaming Scenarios

Figure 1:
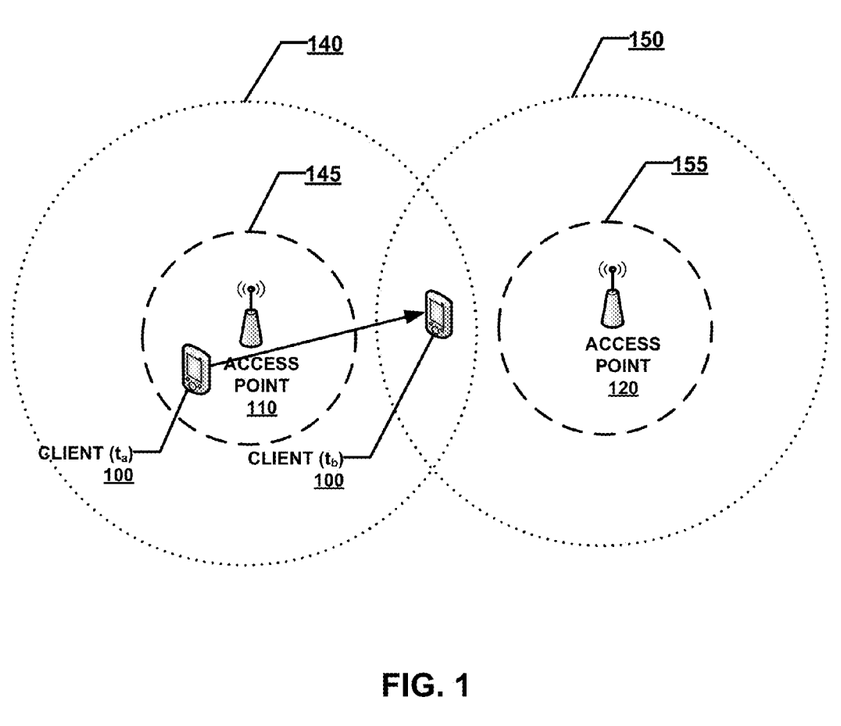
FIG. 1 shows an exemplary wireless network environment according to embodiments of the present disclosure.
Figure 2:
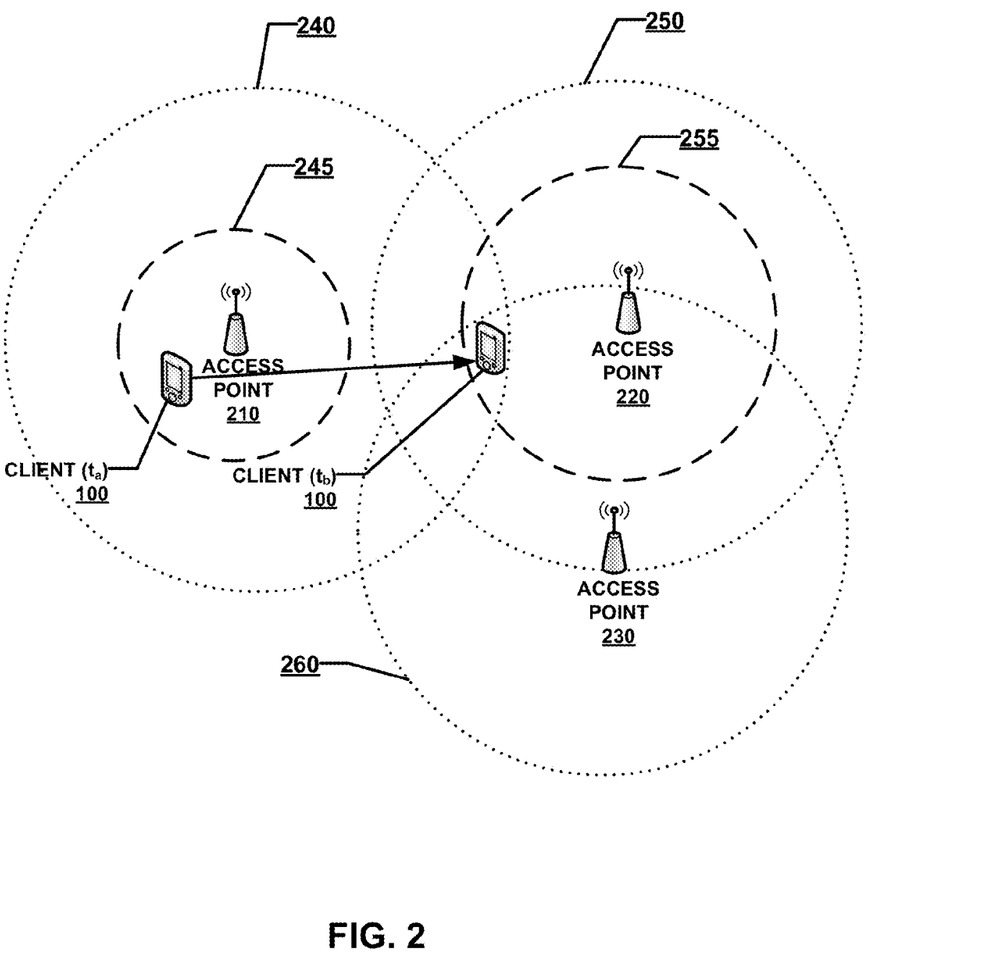
FIG. 2 shows an exemplary wireless network environment according to embodiments of the present disclosure.
Figure 3:
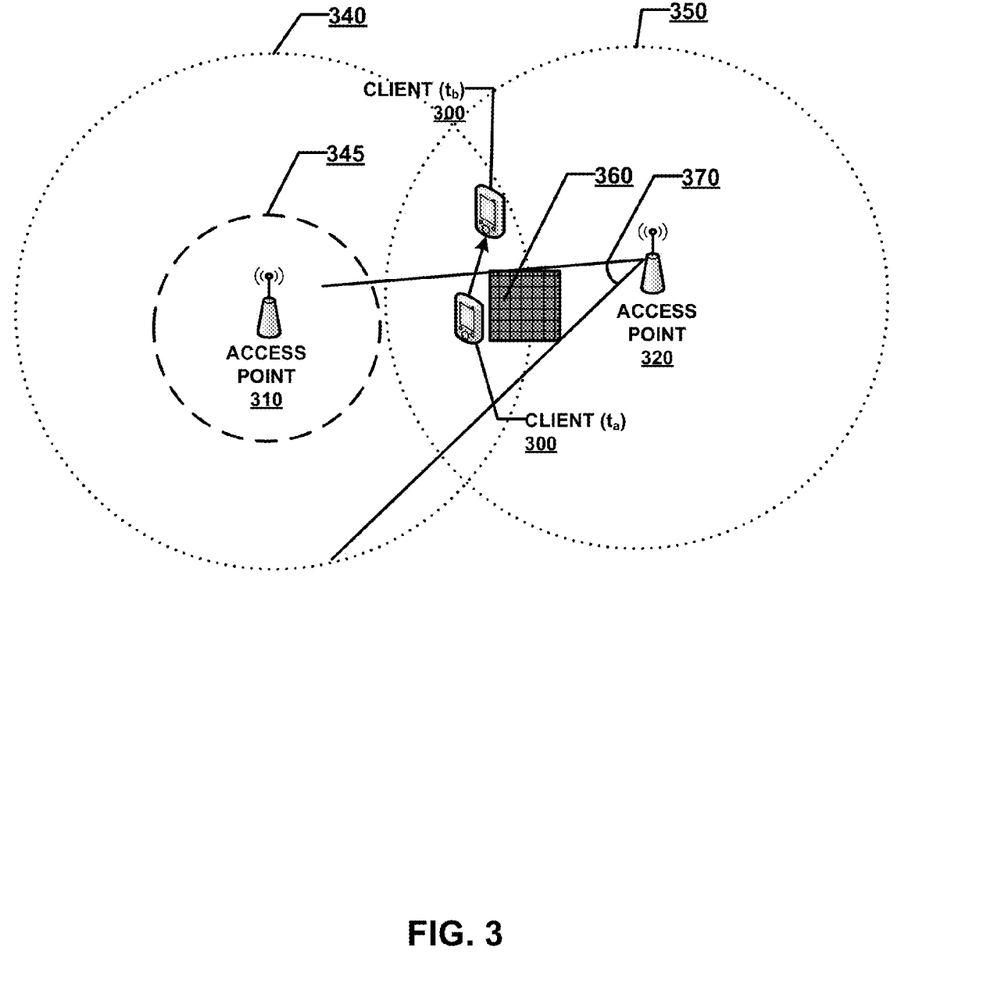
FIG. 3 shows an exemplary wireless network environment according to embodiments of the present disclosure.

FIGS. 1-3 illustrate three different exemplary wireless network environments to which the present disclosure can be applied. However, it shall be noted that these scenarios are provided for illustration purposes only. The disclosed technique can be used in other scenarios not shown in the figures without departing from the spirit of the present disclosure.

A. Controlled Timing of Client Roaming Initiation

FIG. 1 shows an exemplary wireless network environment according to one exemplary deployment scenario of the present disclosure. FIG. 1 includes access point 110 and access point 120 in a wireless local area network (WLAN) and client 100.

Access points 110 and 120 are hardware units that act as communication nodes by linking wireless mobile stations, such as personal computers, smart phones, and so on, to a wired network. Access point 110 or 120 may connect client devices or users to other client devices or users in the network. Also, access point 110 or 120 may serve as a point of connection between a WLAN and a wired network.

Access point 110 or 120 may have one or more radios. The radios may be configured to communicate with various wireless devices via multiple wireless links on multiple wireless communication channels supported by wireless communication standards. In particular, the radios may include multiple antennas to support Institute of Electrical and Electronics Engineers (IEEE) 802.11 wireless networking standards, Worldwide Interoperability for Microwave Access standards (WiMAX), 4th Generation cellular wireless standards (4G), 3rd Generation Partnership Project Long Term Evolution (3GPP LTE), and Evolved High-Speed Packet Access (HSPA+).

Access point 110 or 120 may generally broadcast a unique network identifier, such as a service set identifier (SSID). In some embodiments, access point 110 or 120 may advertise the SSID at one or more pre-configured channel frequencies. Note that, different channel frequencies correspond to different distances to which a signal transmitted from the AP can reach, or by which the AP can receive the signal from a station. In other embodiments, access point 110 or 120 may advertise multiple SSIDs on multiple radios over one or more wireless communication channels. Likewise, access point 110 or 120 may communicate with multiple clients on one or more networks over one or more wireless communication channels.

In some embodiments, access point 110 or 120 performs media access control (MAC) processing functions. The MAC processing functions include, for example, terminating the wireless transmission data and management protocols, translating data between the wired and wireless portions of the network, maintaining statistical information regarding wireless clients and the radio environment, and so on.

In some embodiments, the WLAN may additionally include one or more network controllers performing MAC processing functions. Network controller can be any hardware or software module or any combination thereof, which provides one or more of such functionalities as network configuration, network performance monitoring, network security, network fault management, network accounting management, etc. Also, note that the network controller can be a virtual controller, which operates on one or more access points in the wireless network. The virtual controller may be elected among the one or more access points or configured by a network administrator.

Wireless client 100 may be any computing device that includes a network communication interface, which is capable of wireless communications. For example, wireless client 100 can be, but is not limited to, smart mobile phone, laptop or tablet computing device, personal desktop or work station, etc. Wireless client 100 can be a mobile device; and thus, capable of moving from one location to another location. Meanwhile, wireless client 100 may receive packets from different network devices (e.g. access points, etc.) with different signal strength at each location that wireless client 100 moves to. In addition, different wireless client devices may receive packets with different signal strengths at the same physical location.

Further, wireless client 100 can be configured with one or more thresholds of signal strength measures, which can be measured by wireless signal indicators such as SNR (Signal Noise Ratio), RSSI (Received Signal Strength Indicator), Signal Noise Ratio (SNR), Noise Figure (NF), Noise Factor (F), and Excess Noise Ratio (ENR), etc. For example, wireless client 100 can be configured with a predetermined high watermark threshold and/or a predetermined low watermark threshold. Note that, the thresholds may be determined on a per-client basis, per-AP basis, or a combination of both. Also, the thresholds may be statically configured by a network administrator, or dynamically adjust so that the high watermark coverage area of one access point does not overlap or has reduced overlaps with the low watermark coverage areas of other access points in the same network.

In example illustrated in FIG. 1, circular area enclosed by boundary 145 corresponds to the high RSSI watermark coverage area for access point 110. Likewise, circular area enclosed by boundary 140 corresponds to the low RSSI watermark coverage area for access point 110. Moreover, circular area enclosed by boundary 150 corresponds to the low RSSI watermark coverage area for access point 120. The circular area enclosed by boundary 155 corresponds to the high RSSI watermark coverage area. It is contemplated that, in lieu of RSSI values, other wireless strength measurements may be used as the parameter for establishing the coverage areas.

In some embodiments, wireless client 100 remains associated with an access point (e.g., access point 110) unless the signal strength of a received packet from the access point becomes lower than the predetermined low watermark threshold (e.g., outside the coverage area enclosed by boundary 140). In some embodiments, wireless client 100 associates with a new access point (e.g., access point 120) if the signal strength of a received packet from the new access point becomes higher than the predetermined high watermark (e.g., inside the circular area enclosed by boundary 155).

However, in certain scenarios, as illustrated in FIG. 1, wireless client 100 may move from a first location at time $t_a$ to a second location at time $t_b$, whereas the first location is, for example, within the high RSSI watermark coverage associated with access point 110 and outside the low RSSI coverage area associated with access point 120, and whereas the second location is associated, for example, with higher signal strength for packets received from access point 120 than signal strength for packets received from access point 110 but not high enough to be over the predetermine high RSSI watermark. Therefore, at time $t_a$, wireless client 100 is preferably associated with access point 110; and at time $t_b$, wireless client 100 is preferably associated with access point 120. This means that it would be preferable for wireless client 100 to initiate roaming process earlier than it observes the signal strength of packets received from access point 120 becomes higher than the predetermined high RSSI watermark.

To accomplish this, in some embodiments, a network device (such as a controller, or access points, etc.) may signal to wireless client 100 to disassociate or de-authenticate with access point 110, and to associate with access point 120, which offers better wireless connectivity as indicated by, for example, higher signal strengths. In other embodiments, wireless client 100 may get disconnected with access point 110 at time $t_b$, the network device may signal access point 110 not to respond to any connection requests received from wireless client 100, and at the same time, signal access point 120 to respond to connection request received from wireless client 100.

Therefore, by selectively signaling some access points in the network to respond to (or discard) connection requests from a particular client or by signaling a client to disassociate or de-authenticate with an access point that it connects to, the network device gains control over the client's roaming decision as to when the client will be associated with another network device in the network.

It is important to note that the signal strength of a packet that a client receives from a network device (e.g., an AP) may not be the same or similar to the signal strength of another packet that the network device (e.g., the AP) receives from the client. Typically, the signal strength of the packet received by the network device provides more useful information and forms a more reliable basis for the determination regarding which network device from a plurality of network devices in the network is a better choice for the client to connect to, or when is a better time for the client to connect to the network device, etc.

B. Controlled Client Selection of Network Device

FIG. 2 shows an exemplary wireless network environment according to one exemplary deployment scenario of the present disclosure. FIG. 2 includes access point 210, access point 220, and access point 230 in a wireless local area network (WLAN) and client 200. Access points 210, 220, and 230 are hardware units that act as communication nodes by linking wireless mobile stations, such as personal computers, smart phones, and so on, to a wired network. Access point 210, 220, or 230 may connect client devices or users to other client devices or users in the network. Also, access point 210, 220, or 230 may serve as a point of connection between a WLAN and a wired network.

Access point 210, 220, or 230 may each generally broadcast a unique network identifier, such as a service set identifier (SSID). In some embodiments, access point 210, 220, or 230 may advertise the SSID at one or more pre-configured channel frequencies. Note that, different channel frequencies correspond to different distances to which a signal transmitted from the AP can reach, or by which the AP can receive the signal from a station. In other embodiments, access point 210, 220, or 230 may advertise multiple SSIDs on multiple radios over one or more wireless communication channels. Likewise, access point 210, 220, or 230 may communicate with multiple clients on one or more networks over one or more wireless communication channels.

In some embodiments, access point 210, 220, or 230 performs media access control (MAC) processing functions. The MAC processing functions include, for example, terminating the wireless transmission data and management protocols, translating data between the wired and wireless portions of the network, maintaining statistical information regarding wireless clients and the radio environment, and so on. In some embodiments, the WLAN may additionally include one or more network controllers performing MAC processing functions. Network controller can be any hardware or software module or any combination thereof, which provides one or more of such functionalities as network configuration, network performance monitoring, network security, network fault management, network accounting management, etc. Also, note that the network controller can be a virtual controller, which operates on one or more access points in the wireless network. The virtual controller may be elected among the one or more access points or configured by a network administrator.

Wireless client 200 may be any computing device that includes a network communication interface, which is capable of wireless communications. For example, wireless client 200 can be, but is not limited to, smart mobile phone, laptop or tablet computing device, personal desktop or work station, etc. Wireless client 200 can be a mobile device; and thus, capable of moving from one location to another location. Meanwhile, wireless client 200 may receive packets from different network devices (e.g. access points, etc.) with different signal strength at each location that wireless client 200 moves to. In addition, different wireless client devices may receive packets with different signal strengths at the same physical location.

Further, wireless client 200 can be configured with one or more thresholds of signal strength measures, which can be measured by wireless signal indicators such as SNR (Signal Noise Ratio), RSSI (Received Signal Strength Indicator), etc. For example, wireless client 200 can be configured with a predetermined high watermark threshold and/or a predetermined low watermark threshold.

In example illustrated in FIG. 2, circular area enclosed by boundary 245 corresponds to the high RSSI watermark coverage area for access point 210. Likewise, circular area enclosed by boundary 240 corresponds to the low RSSI watermark coverage area for access point 210. Moreover, circular area enclosed by boundary 250 corresponds to the low RSSI watermark coverage area for access point 220. The circular area enclosed by boundary 255 corresponds to the high RSSI watermark coverage area for access point 220. Further, circular area enclosed by boundary 260 corresponds to the low RSSI watermark coverage area for access point 230 (the high RSSI watermark coverage area for access point 230 is not shown in FIG. 2 for simplicity of illustration).

Note that, the thresholds may be determined on a per-client basis, per-AP basis, or a combination of both. When a per-client based threshold is used, each client device is associated with a unique high/low signal strength watermark. Therefore, the high RSSI coverage area enclosed by boundary 245, which is associated with access point 210 in FIG. 2, will be similar in size to the high RSSI coverage area enclosed by boundary 255, which is associated with access point 220. Likewise, the low RSSI coverage area enclosed by boundary 240 which corresponds to access point 210 will be similar in size to the low RSSI coverage area enclosed by boundary 250 or 260, which is associated with access point 220 or 230 respectively.

On the other hand, when a per-AP based threshold is used, each AP is associated with a unique high/low signal strength watermark, which is common for all clients associated with the AP. For example, the low RSSI coverage area enclosed by boundary 240 (which corresponds to access point 210) may be different from the low RSSI coverage area enclosed by boundary 250 (which corresponds to access point 220) and the low RSSI coverage area enclosed by boundary 260 (which corresponds to access point 230). However, the size of the low RSSI coverage area may be same or similar in size for most if not all clients associated with the corresponding access point.

Additionally, when a combination of a per-client and per-AP threshold is used, each client is associated with a unique high/low signal strength watermark when it is associated with a specific AP. The high/low signal strength watermark may change when the same client associates with a different AP or when a different client associates with the same AP. For example, when a new client associate with access point 210, the new client may be configured with a different high/low RSSI watermark corresponding to access point 210 than what wireless client 200 observe when associated with access point 210 (e.g. areas enclosed by boundaries 240 and 245). Further, when the new client roams to associate with access point 220, the new client may observe yet another set of high/low RSSI watermarks corresponding to access point 220, which are different from the ones the client observe while connected with access point 210, and which are also different from the ones that wireless client 200 would observe if connected to access point 220.

Also, the thresholds may be statically configured by a network administrator, or dynamically adjust so that the high watermark coverage area of one access point does not overlap or has reduced overlaps with the low watermark coverage areas of other access points in the same network.

In some embodiments, wireless client 200 remains associated with an access point (e.g., access point 210) unless the signal strength of a received packet from the access point becomes lower than the predetermined low watermark threshold (e.g., outside the coverage area enclosed by boundary 240). In some embodiments, wireless client 200 associates with a new access point (e.g., access point 220 or 230) if the signal strength of a received packet from the new access point becomes higher than the predetermined high watermark (e.g., inside the circular area enclosed by boundary 255).

Specifically, in the scenario illustrated in FIG. 2, wireless client 200 may move from a first location at time $t_a$ to a second location at time $t_b$, whereas the first location is, for example, within the high RSSI watermark coverage area 245 associated with access point 210 and outside the low RSSI coverage area 250 and 260 associated with access points 220 and 230 respectively, and whereas the second location is within the high RSSI watermark coverage area 255 associated with access point 220 but outside the high RSSI watermark coverage area associated with access points 210 and 230. Therefore, at time $t_a$, wireless client 200 is preferably associated with access point 210; and at time $t_b$, wireless client 200 is preferably associated with access point 220. This means that it would be preferable for wireless client 200 to initiate association process with access point 220 rather than access point 230 as wireless client 200 is moving towards the edge of the low RSSI coverage area 240 associated with access point 210. However, this may not always be the case, because, as described above, the signal strengths of packets from access point 220 or 230 received by wireless client 200 may be different, or even misleading, compared to the signal strengths of packets received by access point 220 or 230 from wireless client 200.

In some embodiments, to control wireless client 200 associate at time $t_b$ with the preferred access point (in this case, access point 220), a network device (such as a controller, or access points, etc.) may signal to wireless client 200 to disassociate or de-authenticate with access point 210, and to associate with access point 220, which offers better wireless connectivity as indicated by, for example, higher signal strengths, compared to other access points in the network such as access point 210 or 230. In other embodiments, wireless client 200 may get disconnected with access point 210 at time $t_b$, the network device may signal access point 210 and 230 not to respond to any connection requests received from wireless client 200. Meanwhile, the network device may signal access point 220 to respond to connection request received from wireless client 200.

Therefore, by selectively signaling some access points in the network to respond to (or ignore) connection requests from a particular client or by signaling a client to disassociate or de-authenticate with an access point that it connects to, the network device gains control over the client's roaming decision as to which network device the client will be associated with.

C. Controlled Client's Persistent Association with Network Device

FIG. 3 shows an exemplary wireless network environment according to one exemplary deployment scenario of the present disclosure. FIG. 3 includes access point 310 and access point 320 in a wireless local area network (WLAN) and client 300. Access points 310 and 320 are hardware units that act as communication nodes by linking wireless mobile stations, such as personal computers, smart phones, and so on, to a wired network. Access point 310 or 320 may connect client devices or users to other client devices or users in the network. Also, access point 310 or 320 may serve as a point of connection between a WLAN and a wired network.

Access point 310 or 320 may each generally broadcast a unique network identifier, such as a service set identifier (SSID). In some embodiments, access point 310 or 320 may advertise the SSID at one or more pre-configured channel frequencies. Note that, different channel frequencies correspond to different distances to which a signal transmitted from the AP can reach, or by which the AP can receive the signal from a station. In other embodiments, access point 310 or 320 may advertise multiple SSIDs on multiple radios over one or more wireless communication channels. Likewise, access point 310 or 320 may communicate with multiple clients on one or more networks over one or more wireless communication channels.

In some embodiments, access point 310 or 320 performs media access control (MAC) processing functions. The MAC processing functions include, for example, terminating the wireless transmission data and management protocols, translating data between the wired and wireless portions of the network, maintaining statistical information regarding wireless clients and the radio environment, and so on. In some embodiments, the WLAN may additionally include one or more network controllers performing MAC processing functions. Network controller can be any hardware or software module or any combination thereof, which provides one or more of such functionalities as network configuration, network performance monitoring, network security, network fault management, network accounting management, etc. Also, note that the network controller can be a virtual controller, which operates on one or more access points in the wireless network. The virtual controller may be elected among the one or more access points or configured by a network administrator.

Wireless client 300 may be any computing device that includes a network communication interface, which is capable of wireless communications. For example, wireless client 300 can be, but is not limited to, smart mobile phone, laptop or tablet computing device, personal desktop or work station, etc. Furthermore, wireless client 300 can be configured with one or more thresholds of signal strength measures, which can be measured by wireless signal indicators such as SNR (Signal Noise Ratio), RSSI (Received Signal Strength Indicator), etc. For example, wireless client 300 can be configured with a predetermined high watermark threshold and/or a predetermined low watermark threshold.

In example illustrated in FIG. 3, circular area enclosed by boundary 345 corresponds to the high RSSI watermark coverage area for access point 310. Likewise, circular area enclosed by boundary 340 corresponds to the low RSSI watermark coverage area for access point 310. Moreover, circular area enclosed by boundary 350 corresponds to the low RSSI watermark coverage area for access point 320. The high RSSI watermark coverage area for access point 320 is not shown in FIG. 3 for simplicity of illustration.

Note that, the thresholds may be determined on a per-client basis, per-AP basis, or a combination of both. When a per-client based threshold is used, each client device is associated with a unique high/low signal strength watermark. On the other hand, when a per-AP based threshold is used, each AP is associated with a unique high/low signal strength watermark, which is common for all clients associated with the AP. Additionally, when a combination of a per-client and per-AP threshold is used, each client is associated with a unique high/low signal strength watermark when it is associated with a specific AP. The high/low signal strength watermark may change when the same client associates with a different AP or when a different client associates with the same AP. Also, the thresholds may be statically configured by a network administrator, or dynamically adjust so that the high watermark coverage area of one access point does not overlap or has reduced overlaps with the low watermark coverage areas of other access points in the same network.

In addition, wireless client 300 can be a mobile device capable of moving from one location to another location. Meanwhile, wireless client 300 may receive packets from different network devices (e.g. access points, etc.) with different signal strength at each location that wireless client 300 moves to. This might be so even if wireless client 300 moves to two different locations, each of which has the same distance to the network device. For example, in the illustration of FIG. 3, obstacle 360 is placed within the low RSSI coverage area 350 corresponding to access point 320, such that, when wireless client 300 is located within angled area 370 cornered at access point 320, wireless client 300 will observe significant drop in the signal strengths of packets received from access point 320. Therefore, wireless client 300 will preferably associate with access point 310 at time $t_a$ when signals from access point 320 are weakened by obstacle 360. Next, assuming that at time $t_b$, wireless client 300 moves to a new location which is outside angled area 370, and thus not affected by obstruction from obstacle 360. Therefore, at time $t_b$, wireless client 300 will observe stronger signals from access point 320 than access point 310. Accordingly, wireless client 300 will prefer to associate with access point 320 at time $t_b$. In certain situations, wireless client 300 may be moving back and forth between the two locations depicted in FIG. 3. Hence, a toggling situation may occur. For example, wireless client 300 may be associated back and forth between access point 310 and access point 320. To prevent such toggling situation, a network device may control wireless client 300 to remain associated with access point 310 rather than associate with access point 320, when wireless client 300 moves to the location near its location at time $t_b$.

In some embodiments, to control wireless client 300 to remain associated at time $t_b$ with the currently associated access point (in this case, access point 310), a network device (such as a controller, or access points, etc.) may signal access point 320 not to respond to any connection requests received from wireless client 300. Meanwhile, the network device may optionally signal access point 320 to respond to connection request, such as re-association requests, received from wireless client 300.

Therefore, by selectively signaling some access points in the network to respond to (or ignore) connection requests from a particular client, the network device gains control over the client's roaming decision as whether to remain connected with an already connected network device.

Basis of Controlling Decision

Figure 4:
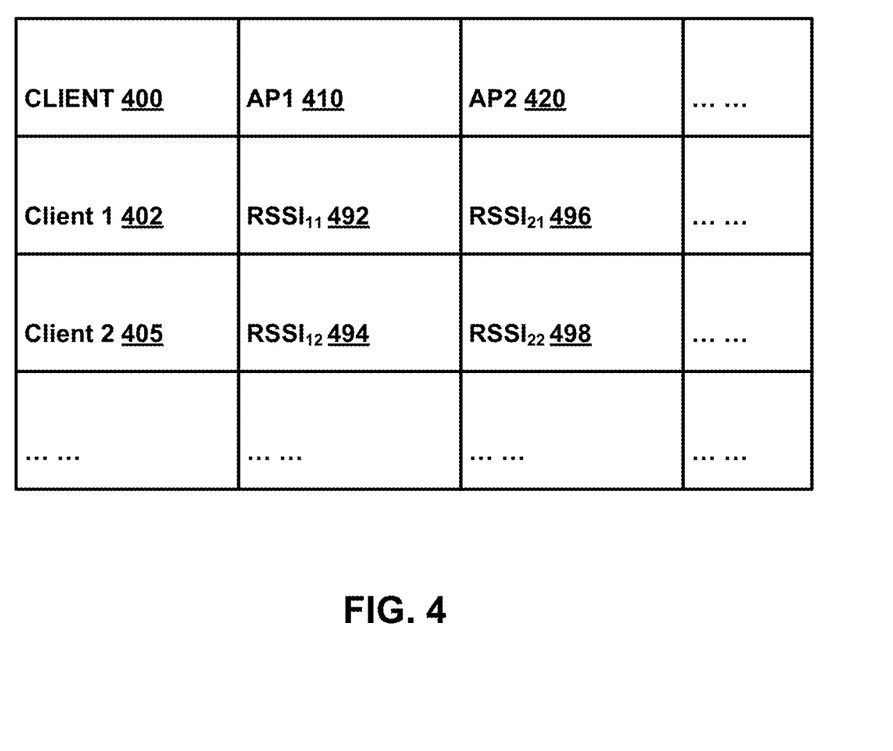
FIG. 4 shows a block diagram illustrating an exemplary data storage used in controlled client roaming according to embodiments of the present disclosure.

The determination of a network device's controlling decision is based on multiple records collecting signal strengths of packets received from each client by the access points in the network. FIG. 4 illustrates an exemplary data storage used in controlled client roaming. In this example, the collected signal strengths are stored in a table. The table depicted in FIG. 4 includes a first column Client 400 indicating the wireless client that sends the packet, a second column AP1 410 indicating the signal strengths of packets received by AP1 from various clients, a third column AP2 420 indicating the signal strengths of packets received by AP2 from various clients, etc.

On the other hand, each row in the exemplary table corresponds to signal strengths of packets received from a particular client by various APs in the network. For example, the second row beginning with Client 1 402 includes signal strengths of packets received from Client 1 402 by AP1 410 (e.g., $RSSI_{11}$ 492) and by AP2 420 (e.g., $RSSI_{21}$ 496) respectively. Likewise, the third row beginning with Client 2 405 includes signal strengths of packets received from Client 2 405 by AP1 410 (e.g., $RSSI_{11}$ 494) and by AP2 420 (e.g., $RSSI_{21}$ 498) respectively.

In some embodiments, RSSI entries in the table are updated periodically. In some embodiments, the network device updates a respective RSSI entry in the table when the corresponding AP receives a packet from the corresponding client. In some embodiments, the network device updates a respective RSSI entry when it receives an update notification from another network device (such as a network controller, an access point, etc).

Controlled Client Roaming Process

Figure 5:
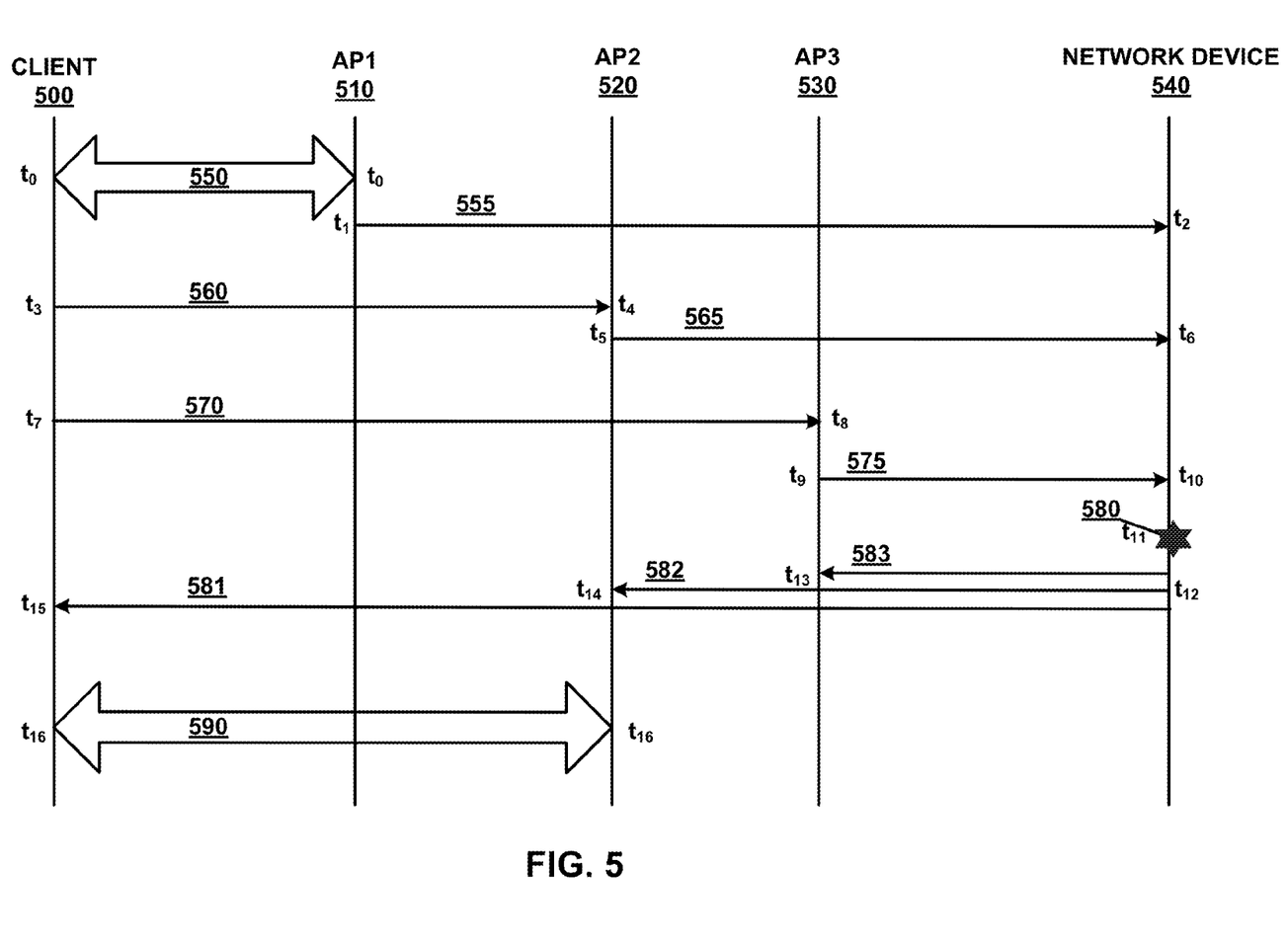
FIG. 5 shows a sequence diagram illustrating an exemplary communication exchanges for controlled client roaming according to embodiments of the present disclosure.

FIG. 5 shows a sequence diagram illustrating an exemplary communication changes during an exemplary controlled client roaming process according to one embodiment of the present disclosure. The communication exchanges illustrated in FIG. 5 includes at least, for example, client 500, AP1 510, AP2 520, AP3 530, and network device 540. At initial time point $t_0$, client 500 is associated with AP1 510 (operation 550). When AP1 510 receives a packet from client 500 at time point $t_1$, AP1 sends an update of the signal strength associated with the received packet to network device 540 (operation 555). Update message 555 also indicates a client identifier identifying client 500 and optionally a unique identifier identifying AP1 510. Network device 540 receives the information including the signal strength at time point $t_2$ and updates its record entry corresponding to the signal strength received from client 500 by AP1 510 accordingly.

Subsequently at time point $t_3$, client 500 sends a connection request, such as a probe request or an association request, to AP2 520 (operation 560). When AP2 520 receives the request packet from client 500 at time point $t_4$, AP2 570 sends an update of the signal strength associated with the received packet to network device 540 at time point $t_5$ (operation 565). Update message 565 also indicates a client identifier identifying client 500, and optionally a unique identifier identifying AP2 520. Network device 540 receives the information including the signal strength at time point $t_6$ and updates its record entry corresponding to the signal strength received from client 500 by AP2 520 accordingly.

Next, at time point $t_7$, client 500 sends a connection request, such as a probe request or an association request, to AP3 530 (operation 570). When AP3 570 receives the request packet from client 500 at time point $t_8$, AP3 570 sends an update of the signal strength associated with the received packet to network device 540 at time point $t_9$ (operation 575). Update message 565 also indicates a client identifier identifying client 500, and optionally a unique identifier identifying AP3 530. Network device 540 receives the information including the signal strength at time point $t_{10}$ and updates its record entry corresponding to the signal strength received from client 500 by AP3 530 accordingly.

At time point $t_{11}$, for example, network device 540 determines that the RSSI of packets received from client 500 by AP1 510 (that is, the AP that client 500 is currently associated with) drops below a predetermined low RSSI watermark. In addition, network device determines that the RSSI of packets received from client 500 by AP2 520 is higher than both the RSSI of packets received from client 500 by AP3 530 and a predetermined high RSSI watermark. Therefore, network device 540 may determine at time point $t_{11}$ that client 500 would benefit from better connectivity by connecting to AP2 520 (operation 580).

Accordingly, network device 540 may send a message to client 500 instructing client 500 to disassociate with AP1 510 or otherwise disconnect with AP1 510 (operation 581). Alternatively, the message may be sent to AP1 510 instructing AP1 to disassociate with client 500, or de-authenticate client 500, or otherwise disconnect with client 500. The message is received by client 500 (or AP1 510, not shown) at time point $t_{15}$. On the other hand, network device 540 may optionally send a message to AP2 520 instructing AP2 520 to respond to connection requests received from client 500, such as the packet received from client 500 at time point $t_4$ (operation 582). The message is received by AP2 520 at time point $t_{14}$. In addition, at time point $t_{12}$, network device 540 may send a message to AP3 530 instructing AP3 530 to ignore connection requests received from client 500, such as the packet received from client 500 at time point $t_8$ (operation 583). The message is received by AP3 530 at time point $t_{13}$. As a result, AP2 520 will be the only AP that responds to connection requests initiated by client 500. Therefore, client 500 will establish a connection with AP2 520 at time point $t_{16}$ (operation 590).

Figure 6A:
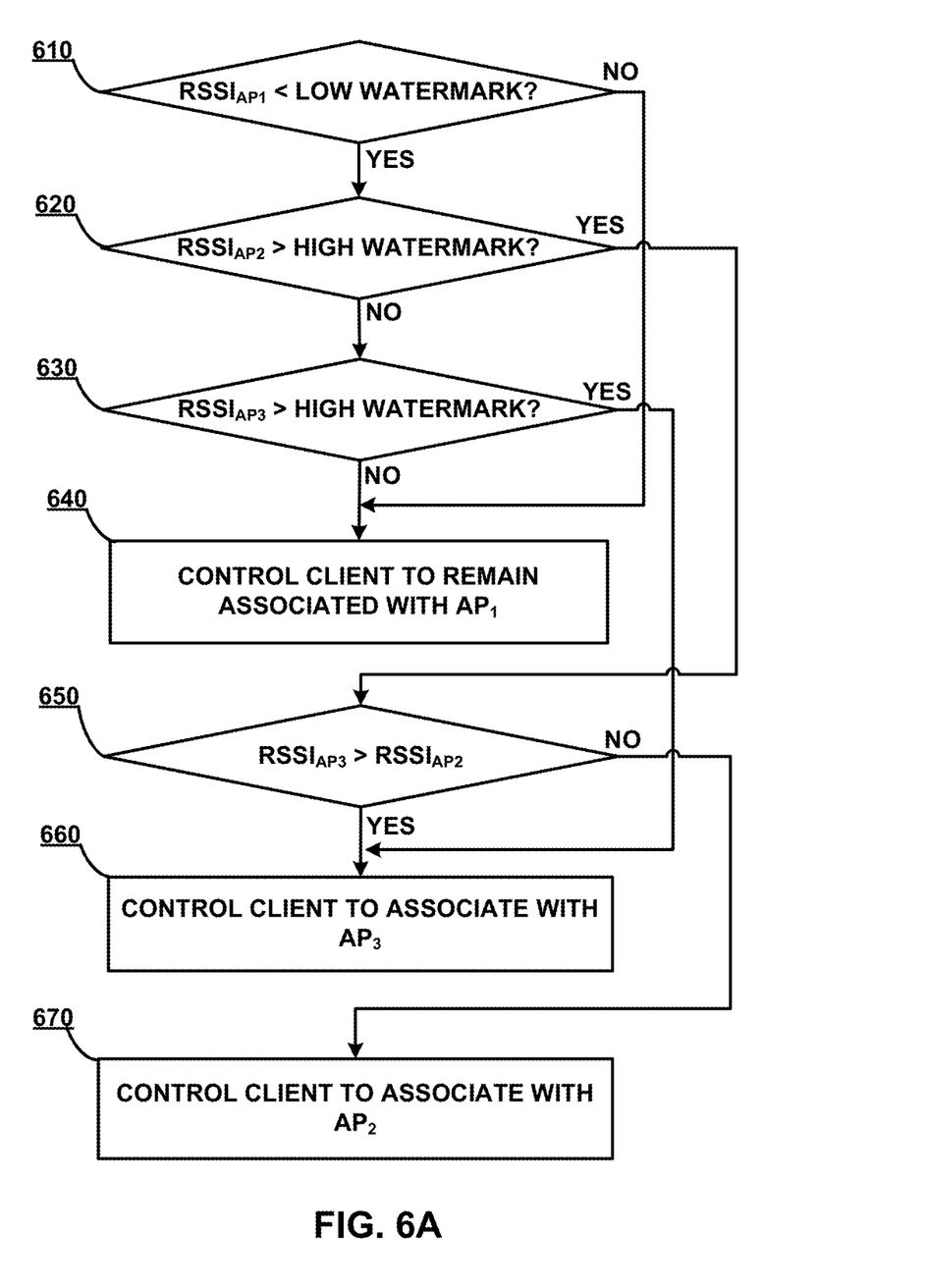
FIGS. 6A-6B show flowcharts illustrating exemplary processes for controlled client roaming by a network device according to embodiments of the present disclosure.

FIG. 6A shows a flowchart illustrating an exemplary process for controlled client roaming by a network device. During operation, a network device, such as an access point, determines whether the signal strength (e.g., a RSSI level) of a packet received from a first AP that a client currently associates with (e.g., AP1) is lower than a predetermined low RSSI watermark (operation 610).

If the signal strength from the first AP is lower than the predetermined RSSI watermark, the network device further determines whether the signal strength (e.g., a RSSI level) of a packet received from a second AP, from which the client is capable of receiving beacon frames, is higher than a predetermined high RSSI watermark (operation 620). If so, the network device further determines whether the signal strength (e.g., a RSSI level) of a packet received from a third AP, from which the client is also capable of receiving beacon frames, is higher than the signal strength (e.g., a RSSI level) of a packet received from the second AP (operation 650).

If signal strength of a packet received from the third AP is higher than the signal strength of a packet received from the second AP, the network device will control the client to associate with the third AP (operation 660). Otherwise, the network device will control the client to associate with the second AP (operation 670).

On the other hand, if the signal strength of a packet received from the second AP is not higher than the predetermined high RSSI watermark, the network device further determines whether the signal strength (e.g., a RSSI level) of a packet received from the third AP, from which the client is capable of receiving beacon frames, is higher than a predetermined high RSSI watermark (operation 630). If so, the network device will control the client to associate with AP3 (operation 660). Otherwise, the network device will control the client to remain connected with AP1 (operation 640). Moreover, if the signal strength (e.g., a RSSI level) of a packet received from the first AP that the client currently associates with (e.g., AP1) is not lower than the predetermined low RSSI watermark, the network device will control the client to remain connected with AP1 (operation 640).

Note that, the high RSSI watermark and/or the low RSSI watermark may be determined on a per-client basis, per-AP basis, or a combination of both. When a per-client based threshold is used, the client is associated with a unique high/low RSSI watermark. On the other hand, when a per-AP based RSSI watermark is used, each of AP1, AP2, and AP3 is associated with a unique high/low RSSI watermark, which is common for all clients associated with the respective AP. Additionally, when a combination of a per-client and per-AP RSSI watermark is used, each client is associated with a unique high/low RSSI watermark when it is associated with a specific AP, such as AP1, AP2, or AP3. The high/low RSSI watermark may change when the same client associates with a different AP or when a different client associates with the same AP. Accordingly, the predetermined high RSSI watermark used in operation 630 may be the same as or different from the predetermined high RSSI watermark used in operation 620.

Also, the high/low RSSI watermarks may be statically configured by a network administrator, or dynamically adjusted so that the high watermark coverage area of one access point does not overlap or has reduced its overlaps with the low watermark coverage areas of other access points in the same network.

Figure 6B:
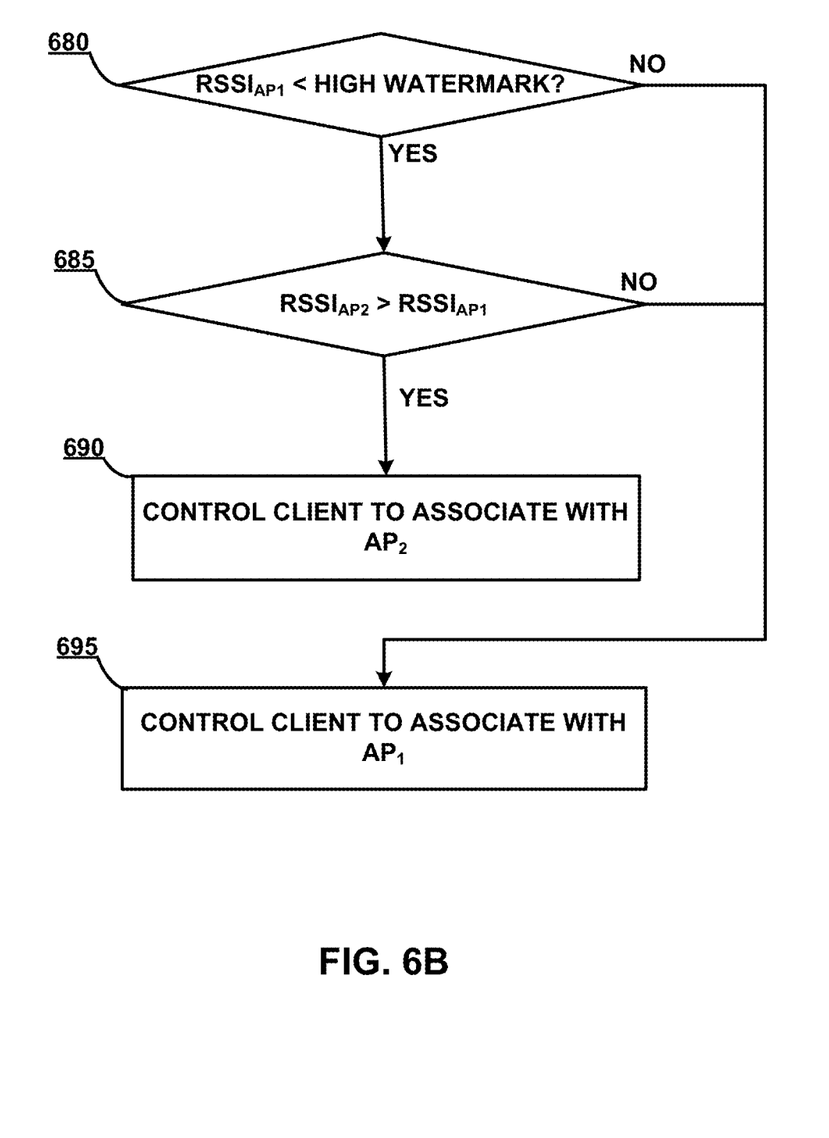

FIG. 6B shows a flowchart illustrating another exemplary process for controlled client roaming by a network device. During operation, a network device, such as an access point, a network controller, etc., determines whether the signal strength (e.g., a RSSI level) of a packet received from a first AP that a client currently associates with (e.g., AP1) is lower than a predetermined high RSSI watermark (operation 680). If not, the network device will control the client to continue associated with the first AP (operation 695). If, however, the signal strength (e.g., a RSSI level) of the packet received from the first AP is lower than the predetermined high RSSI watermark, the network device further determines whether the signal strength of a packet received from a second AP is higher than the signal strength of the packet received from the first AP (operation 685). If the signal strength of the packet received from a second AP is higher than the signal strength of the packet received from the first AP, the network device will control the client to associate with the second AP (operation 690). This is so even though the signal strength of the packet received from first AP may be higher than a predetermined low RSSI watermark.

Therefore, the network device can control over the client's roaming decision as to when the client will be associated with another network device in the network, which network device the client will be associated with, whether to remain connected with an already connected network device, etc. The network device may do so by selectively signaling some access points in the network to respond to (or discard) connection requests from a particular client or by signaling a client to disassociate or de-authenticate with an access point that the client connects to.

It is important to note that the signal strength of a packet that a client receives from a network device (e.g., an AP) may not be the same or similar to the signal strength of another packet that the network device (e.g., the AP) receives from the client. Typically, the signal strength of the packet received by the network device provides more useful information and forms a more reliable basis for the determination regarding which network device from a plurality of network devices in the network is a better choice for the client to connect to, or when is a better time for the client to connect to the network device, etc.

Controlled Client Roaming System

Figure 7:
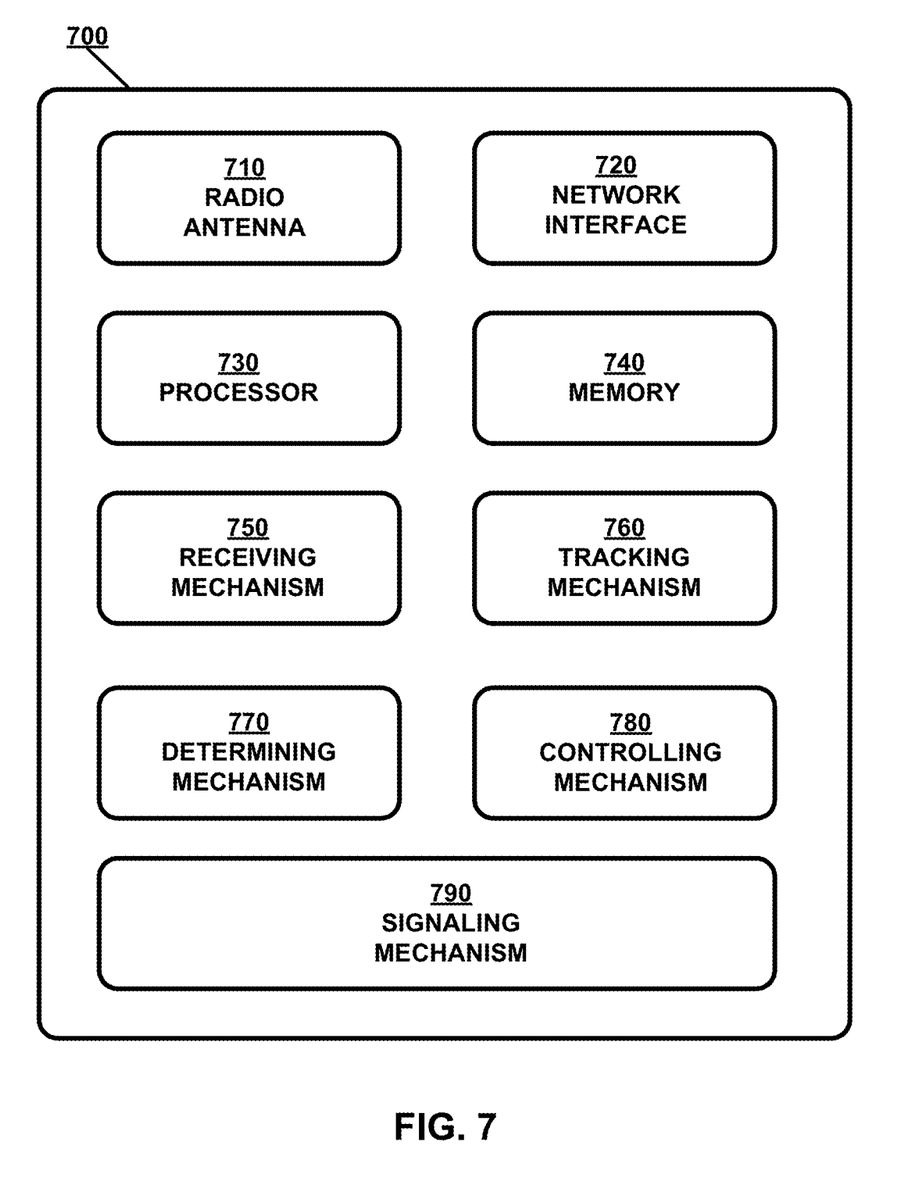
FIG. 7 is a block diagram illustrating a system for controlled client roaming according to embodiments of the present disclosure.

FIG. 7 is a block diagram illustrating a system for controlled client roaming according to embodiments of the present disclosure.

Operating as a node in a wireless digital network, network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a tracking mechanism 760, a determining mechanism 770, a controlling mechanism 780, and a signaling mechanism 790, all of which are coupled to processor 730 and memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc. In some embodiments, memory 740 stores one or more aggregated numbers of wireless client stations associated with one or more access points and/or controllers on one or more specific wireless communication channels.

Receiving mechanism 750 receives one or more network frames via network interface 720 or radio antenna 710. The received network frames may include, but are not limited to, requests and/or responses, beacon frames, management frames, control path frames, and so on, as described in the present disclosure. In some embodiments, receiving mechanism 750 can receive an update of a signal strength corresponding to a packet received from a client by an access point in a network. Note that, the signal strengths can be determined by one or more of wireless signal strength or radio frequency (RF) interference measurements, such as Received Signal Strength Indicator (RSSI), Signal Noise Ratio (SNR), Noise Figure (NF), Noise Factor (F), and Excess Noise Ratio (ENR), etc. Furthermore, the signal strengths may optionally be stored in a table, a list, or other similar data structure, and may be indexed by a client identifier, e.g., a Media Access Control (MAC) address of the client, or an access point identifier, e.g., a Service Set Identifier (SSID) or a Media Access Control (MAC) address corresponding to the access point, or a combination of the client identifier and the access point identifier.

Tracking mechanism 760 tracks signal strengths corresponding to packets received from one or more clients by a plurality of network devices (such as access points) in the network. Tracking mechanism 760 can store the signal strengths, and index the signal strength by a client identifier, a network device identifier, or both. Furthermore, tracking mechanism 760 can update one or more previously stored signal strengths corresponding to the client and the first access point based on the update received by receiving mechanism 750.

Determining mechanism 770 determines whether the client is likely to have better connectivity with a second access point than a first access point among a plurality of access points based at least on the signal strengths corresponding to packets received from the client by the first access point and the second access point tracked by tracking mechanism 760.

In some embodiments, determining mechanism 770 can retrieve a first predetermined threshold indicating a weak signal strength level for packets received from the client by the first access point, and further determine whether the signal strength corresponding to the packet received from the client by the first access point is weaker than the first predetermined threshold.

In some embodiments, determining mechanism 770 can retrieve a second predetermined threshold indicating a strong signal strength level for packets received by the client from the second access point, and further determine whether the signal strength corresponding to the packet received from the client by the second access point is stronger than the second predetermined threshold.

In some embodiments, determining mechanism 770 can retrieve a third predetermined threshold indicating a strong signal strength level for packets received by the client from the third access point, and further determine whether the signal strength corresponding to the packet received from the client by the third access point is stronger than the third predetermined threshold.

In some embodiments, determining mechanism 770 can further determine whether the client is likely to have better connectivity with the second access point than a third access point among the plurality of access points based at least on the tracked signal strengths corresponding to packets received from the client by the second access point and the third access point.

In some embodiments, determining mechanism 770 determines whether the signal strength corresponding to the packet received from the client by the second access point is stronger than the signal strength corresponding to the packet received from the client by the third access point in response to determining that the signal strength corresponding to the packet received from the client by the third access point is stronger than the third predetermined threshold.

It shall be noted that determining mechanism 770 can dynamically determine with which access point among the plurality of access points a client has best connectivity at a given time in similar fashion based on comparison between signal strengths of packets received from the client by different access points, and comparison between one or more signal strengths with a predetermined high and/or low signal strength threshold set for the different access points.

Controlling mechanism 780 can control a client to connect with a preferred access point with which the client is likely to have better connectivity than other access points among a plurality of access points in a wireless network. It is important to note that the signal strength of a packet that a client receives from a network device (e.g., an AP) may not be the same or similar to the signal strength of another packet that the network device (e.g., the AP) receives from the client. Typically, the signal strength of the packet received by network device 700 provides more useful information and a more reliable basis for the determination regarding which access point from a plurality of access points in the network is a better choice for the client to connect to, or when is a better time for the client to connect to the access point, or whether the client should stay connected with an already connected access point, etc.

Signaling mechanism 790 can signal one or more network devices (such as access points, network routers, network controllers, network switches, etc.) to perform or ignore certain actions. For example, signaling mechanism 790 can signal a first access point to disallow a client to connect with the first access point. In addition, signaling mechanism 790 can signal a second access point to respond to a connection request received from the client. Moreover, signaling mechanism 790 can signal a third access point to disallow the client to connect with the third access point. Signaling mechanism 790 may send the signals to multiple access points sequentially or in parallel. Further, signaling mechanism 790 may send the signals to multiple access points directly or through an intermediate relay agent.

Specifically, in some embodiments, signaling mechanism 790 can signal an access point to ignore a probe request received from the client. In some embodiments, signaling mechanism 790 can signal an access point to disassociate with the client which has been associated with the access point. In other embodiments, signaling mechanism 790 can signal an access point to de-authenticate the client which has been authenticated by the access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, the term "wireless station," "client," "client station," "wireless client," "wireless client station," "STA," and/or "mobile device" may be used interchangeably to refer to any electronic device having the capability of moving location yet still communicating, no matter whether the movement and the communication occur during the same or different time periods.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is this to be regarded as illustrative rather than limiting.

What is claimed is:

1. A system comprising:
   at least one network device including a hardware processor;
   the system being configured to perform operations comprising:
   receiving information indicating a first signal strength corresponding to a packet transmitted by a client device and received by a first access point and a second signal strength corresponding to the packet and received by a second access point while the client device is currently associated with the second access point;
   retrieving, by the network device, a first threshold value indicating a weak signal strength level for packets received from the client device;
   retrieving, by the network device, a second threshold value indicating a strong signal strength level for packets received from the client device, wherein the second threshold value is different and stronger than the first threshold value;
   determining that the first signal strength, corresponding to the packet received by the first access point, is weaker than the first threshold value;
   determining that the second signal strength, corresponding to the packet received by the second access point, is stronger than the second threshold value;
   responsive to the first signal strength being weaker than the first threshold value and the second signal strength being stronger than the second threshold value, preventing the client device, currently associated with the second access point, from associating with the first access point.

2. The system of claim 1, wherein the preventing operation comprises:
   signaling, by the network device, the first access point to disallow the client device to connect with the first access point.

3. The system of claim 2, wherein signaling the first access point to disallow the client device to connect with the first access point comprises signaling the first access point to ignore a probe request received from the client device.

4. The system of claim 1, wherein the preventing operation is further responsive to:
   determining that a signal strength corresponding to each of a plurality of received packets transmitted between the client device and the first access point is weaker than the first threshold value.

5. The system of claim 1, wherein the preventing operation is further responsive to:
   determining that a signal strength corresponding to a second received packet transmitted between the client device and the second access point is stronger than the second threshold value.

6. The system of claim 1, wherein the preventing operation comprises configuring the first access point to decline one or more of: an authentication request, an association request, or a re-association request received from the client device.

7. A system comprising:
   a first access point including a hardware processor;
   the system being configured to perform operations comprising:
   receiving information indicating a first signal strength corresponding to a packet transmitted by a client device and received by the first access point and a second signal strength corresponding to the packet received by a second access point while the client device is currently associated with the second access point;
   retrieving, by a network device, a first threshold value indicating a weak signal strength level for packets received from the client device;
   retrieving, by the network device, a second threshold value indicating a strong signal strength level for packets received from the client device, wherein the second threshold value is different and stronger than the first threshold value;
   determining that the first signal strength, corresponding to the packet, is stronger than the second threshold value;
   determining that the second signal strength, corresponding to the packet, is weaker than the first threshold value;
   responsive to the first signal strength being stronger than the second threshold value and the second signal strength being weaker than the first threshold value, controlling the client device, currently associated with the second access point, to associate with the first access point.

8. The system of claim 7, wherein the controlling operation comprises:
   signaling, by the network device, the second access point to disassociate or de-authenticate the client device.

9. The system of claim 7, wherein the controlling operation comprises:
   signaling, by the network device, the first access point to respond to a probe request received from the client device; and signaling, by the network device, the second access point to ignore the probe request received from the client device subsequent to disassociating or de-authenticating the client device.

10. The system of claim 7, wherein the controlling operation is further responsive to:
    determining that a signal strength corresponding to each of a plurality of received packets transmitted between the client device and the first access point is stronger than the second threshold value.

11. The system of claim 7, wherein the controlling operation comprises:
    configuring the second access point to decline one or more of: an authentication request, an association request, or a re-association request received from the client device.

12. A non-transitory computer readable medium comprising instructions which, when executed by one or more devices, causes performance of operations comprising:
    receiving information indicating a first signal strength corresponding to a packet transmitted by a client device and received by a first access point and a second signal strength corresponding to the packet and received by a second access point while the client device is currently associated with the second access point;
    retrieving a first threshold value indicating a weak signal strength level for packets received from the client device;
    retrieving a second threshold value indicating a strong signal strength level for packets received from the client device, wherein the second threshold value is different and stronger than the first threshold value;
    determining that the first signal strength, corresponding to the packet received by the first access point, is weaker than the first threshold value;
    determining that the second signal strength, corresponding to the packet received by the second access point, is stronger than the second threshold value;
    responsive to the first signal strength being weaker than the first threshold value and the second signal strength being stronger than the second threshold value, preventing the client device, currently associated with the second access point, from associating with the first access point.

13. The medium of claim 12, wherein the preventing operation comprises:
    signaling the first access point to disallow the client device to connect with the first access point.

14. The medium of claim 13, wherein signaling the first access point to disallow the client device to connect with the first access point comprises signaling the first access point to ignore a probe request received from the client device.

15. The medium of claim 12, wherein the preventing operation is further responsive to:
    determining that a signal strength corresponding to each of a plurality of received packets transmitted between the client device and the first access point is weaker than the first threshold value.

16. The medium of claim 12, wherein the preventing operation is further responsive to:
    determining that a signal strength corresponding to a second packet received from the client device by the second access point is stronger than the second threshold value.

17. The medium of claim 12, wherein the preventing operation comprises configuring the first access point to decline one or more of: an authentication request, an association request, or a re-association request received from the client device.

18. A non-transitory computer readable medium comprising instructions which, when executed by one or more devices, causes performance of operations comprising:
    receiving information indicating a first signal strength corresponding to a packet transmitted by a client device and received by a first access point and a second signal strength corresponding to the packet received by a second access point while the client device is currently associated with the second access point;
    retrieving a first threshold value indicating a weak signal strength level for packets received from the client device;
    retrieving a second threshold value indicating a strong signal strength level for packets received from the client device, wherein the second threshold value is different and stronger than the first threshold value;
    determining that the first signal strength, corresponding to the packet, is stronger than the second threshold value;
    determining that the second signal strength, corresponding to the packet, is weaker than the first threshold value;
    responsive to the first signal strength being stronger than the second threshold value and the second signal strength being weaker than the first threshold value, controlling the client device, currently associated with the second access point, to associate with the first access point.

19. The medium of claim 18, wherein the controlling operation comprises:
    signaling the second access point to disassociate or de-authenticate the client device.

20. The medium of claim 18, wherein the controlling operation comprises:
    signaling the first access point to respond to a probe request received from the client device; and
    signaling the second access point to ignore the probe request received from the client device subsequent to disassociating or de-authenticating the client device.

21. The system of claim 18, wherein the controlling operation is further responsive to:
    determining that a signal strength corresponding to each of a plurality of received packets transmitted between the client device and the first access point is stronger than the second threshold value.

22. The system of claim 18, wherein the controlling operation comprises:
    configuring the second access point to decline one or more of: an authentication request, an association request, or a re-association request received from the client device.

* * * * *